United States Patent [19]

Kabeya

[11] Patent Number: 5,250,885
[45] Date of Patent: Oct. 5, 1993

[54] SERVO MOTOR CONTROL DEVICE

[75] Inventor: Noriaki Kabeya, Aichi, Japan

[73] Assignee: Brother Kogyo Kabushiki Kaisha, Nagoya, Japan

[21] Appl. No.: 829,382

[22] Filed: Feb. 3, 1992

[30] Foreign Application Priority Data

May 9, 1991 [JP] Japan .................. 3-135825

[51] Int. Cl.$^5$ ........................................... G05B 11/01
[52] U.S. Cl. ..................... 318/560; 318/565; 318/567; 318/605; 318/798; 318/799
[58] Field of Search ............... 318/560, 565, 567, 605, 318/798, 799

[56] References Cited

U.S. PATENT DOCUMENTS

| | | | |
|---|---|---|---|
| 4,623,831 | 11/1986 | Sakamoto et al. | 318/799 |
| 4,891,568 | 1/1990 | Shibata et al. | 318/560 |
| 4,958,118 | 9/1990 | Pottebaum | 318/727 |
| 5,003,239 | 3/1991 | Mathews et al. | 318/565 |
| 5,024,545 | 6/1991 | Yoshimoto et al. | |
| 5,032,778 | 7/1991 | Yamada | 318/686 |

FOREIGN PATENT DOCUMENTS 0289134  11/1988  European Pat. Off.
2241324A 11/1990  United Kingdom.

Primary Examiner—William M. Shoop, Jr.
Assistant Examiner—Karen Masih
Attorney, Agent, or Firm—Oliff & Berridge

[57] ABSTRACT

A printing cam is rotated forward from a print starting position by a motor in a printing operation. Then, a print hammer is driven in association with a cam follower driven by the printing cam, so that a printing operation is executed. An encoder disk is disposed so as to rotate integrally with the printing cam. A plurality of slits are disposed in an equidistantly spaced relationship in an encoder disk. A phase setting portion is provided in the encoder disk as a reference position for providing a rotational position of the encoder disk. The phase setting portion is an interval between two specific slits, the interval being formed by enlarging the interval between two slits. While the encoder disk rotates forward, a slit counter executes an additional operation every time a photosensor detects a slit. While the encoder disk rotates reversely, a slit counter executes an subtractional operation every time the photosensor detects a slit. After the printing operation is ended, the motor rotates reversely. Thus, the printing hammer returns to the print starting position. Meanwhile, until a count value N of the slit counter reaches a count value NS corresponding to the phase setting portion plus 10, the motor is controlled at the speed which is determined by setting a slit interval time to 0.8 $\mu$sec. When the count value N reaches the count value (NS+10), the motor is controlled at a predetermined duty ratio. When the slit interval time T reaches at least 2.4 $\mu$sec. in the passage of the phase setting portion into the photosensor, the count value N is set to be a count value (NS−1).

20 Claims, 10 Drawing Sheets

SERVO MOTOR CONTROL DEVICE

BACKGROUND OF THE INVENTION

1. Field of the Invention

The present invention relates to a servo motor control device which can execute a feedback control for a servo motor, and more particularly, to a servo motor control device which can detect a rotational position of the servo motor, that is, a specific phase of the servo motor.

2. Description of Related Art

Conventionally, there is a control device which detects slits by a photosensor in order to control a rotational speed of an electronic servo motor and executes a feedback control for the servo motor based on an encoder signal from the sensor, wherein an encoder disk plate having a plurality of slits is fixed to a servo motor driving shaft.

In order to detect a reference phase which is used for determining an initial setting position of the servo motor while executing the feedback control for the servo motor, a phase setting slit is formed independently of a rotational speed detecting slit in one location of the encoder disk plate. Further, a sensor is formed independently of a rotational speed detecting sensor in order to detect the phase setting slit.

As described above, a problem is encountered in that two sensors are needed so that the control device can detect the reference phase of the servo motor while executing the feedback control for the servo motor. One sensor is used for the feedback control which controls the rotational speed of the servo motor. The other sensor is used for detecting the reference phase. Therefore, one phase setting portion is formed by enlarging the interval between two specific slits such that only one sensor is used for both the feedback control and for detecting the phase setting portion. That is, only one sensor detects the slits. Thus, the control device can execute the feedback control based on the signal cycle of the encoder signal from the sensor. Simultaneously, the control device can detect the phase setting portion because the encoder signal is longer than the normal encoder signal corresponding to the predetermined interval when the sensor detects the phase setting portion.

However, the above-mentioned control device has the following two problems. When the sensor detects the phase setting portion, the encoder signal cycle from the sensor is longer than the normal encoder signal cycle. The rotational speed of the disk plate then increases because the control device keeps executing the feedback control based on the encoder signal from the sensor in the detecting operation of the phase setting portion. Thus, a speed control has an accidental error. Moreover, since the rotational speed of the servo motor increases, the slit interval time in the phase setting portion does not become longer than the slit interval time in the rotational speed detection. Therefore, the control device may execute an error detection of the phase setting portion.

SUMMARY OF THE INVENTION

An object of the present invention is to provide a servo motor control device which can execute a feedback control for the motor and accurately detect a phase of a disk plate by using an encoder signal from only one slit detection sensor.

According to the present invention, there is provided a servo motor control device comprising an electronic motor, a disk plate which is fixed to a rotational member rotating with the driving shaft of the motor, a plurality of slits formed with a predetermined interval in a circumferential direction therein, a detecting means for detecting a plurality of the slits and a control means for controlling a feedback control in order to control the rotational speed of the motor based on the encoder signal from the detecting means, comprising:

a phase setting portion disposed in at least one position of the disk plate, the phase setting portion being formed by enlarging an interval between a pair of specific slits;

a count means for counting the slits based on a signal from the detecting means; and an instruction means for instructing the control means to cease controlling the motor while at least the detecting means detects the phase setting portion based on a count value of the count means.

It is additionally possible to instruct the control means by the instruction means to start the interruption of the control for the motor prior to detection by the detecting means of the phase setting portion.

According to the servo motor control device of the present invention, the detecting means detects a plurality of slits which are disposed in the disk plate at a predetermined interval with respect to a circumferential direction. The disk plate is fixed to a rotational member of the driving shaft of an electronic motor. The control means executes the feedback control based on the slit interval time of the encoder signal detected by the detecting means. On the other hand, the phase setting portion formed by enlarging the interval between two specific slits is provided in at least one position of the disk plate. Since the count means counts the slits based on the signal from the detecting means, the instruction means instructs the control means to stop the feedback control for the motor based on the encoder signal while at least the detecting means detects the phase setting portion.

Thus, the control means controls the motor such that the motor is driven at the speed which is set just before the feedback control is stopped or at a predetermined speed while at least the detecting means detects the phase setting portion. Therefore, the rotational speed of the motor is prevented from increasing too rapidly. The control means can detect the phase setting portion accurately based on a signal cycle of the encoder signal from the detecting means because the signal cycle is longer than a normal signal corresponding to the predetermined interval.

The servo motor control device of the present invention comprises the phase setting portion in the disk plate, the count means and the instruction means. Since the feedback control for the motor is stopped while at least the detecting means detects the phase setting means, the rotational speed is prevented from erroneously increasing too rapidly. Further, since the rotational speed of the motor does not increase too rapidly, the phase setting portion of the disk plate is accurately detected based on the encoder signal.

BRIEF DESCRIPTION OF THE DRAWINGS

A preferred embodiment of the present invention will be described in detail with reference to the following figures wherein.

DETAILED DESCRIPTION OF THE PREFERRED EMBODIMENTS

A printing apparatus of one preferred embodiment according to the present invention will be described hereinafter with reference to the drawings. The present invention is applied to an electronic typewriter where only one DC motor performs a combination print operation and taking-up operation of a print ribbon, and a combination erasing operation and taking-up operation of a correction ribbon.

Figure 1:
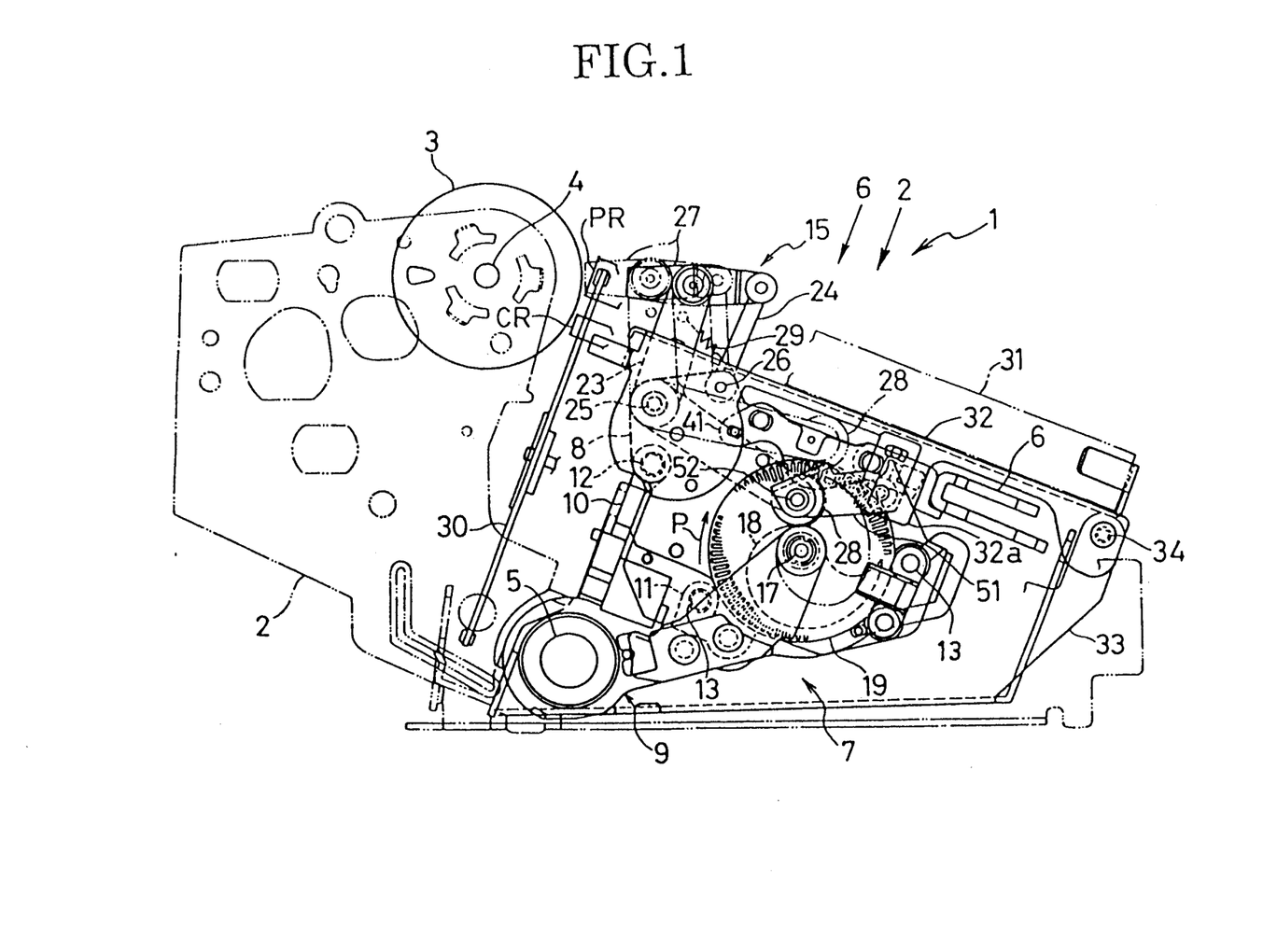
FIG. 1 is a side view of an internal mechanism of an electronic typewriter.
Figure 2:
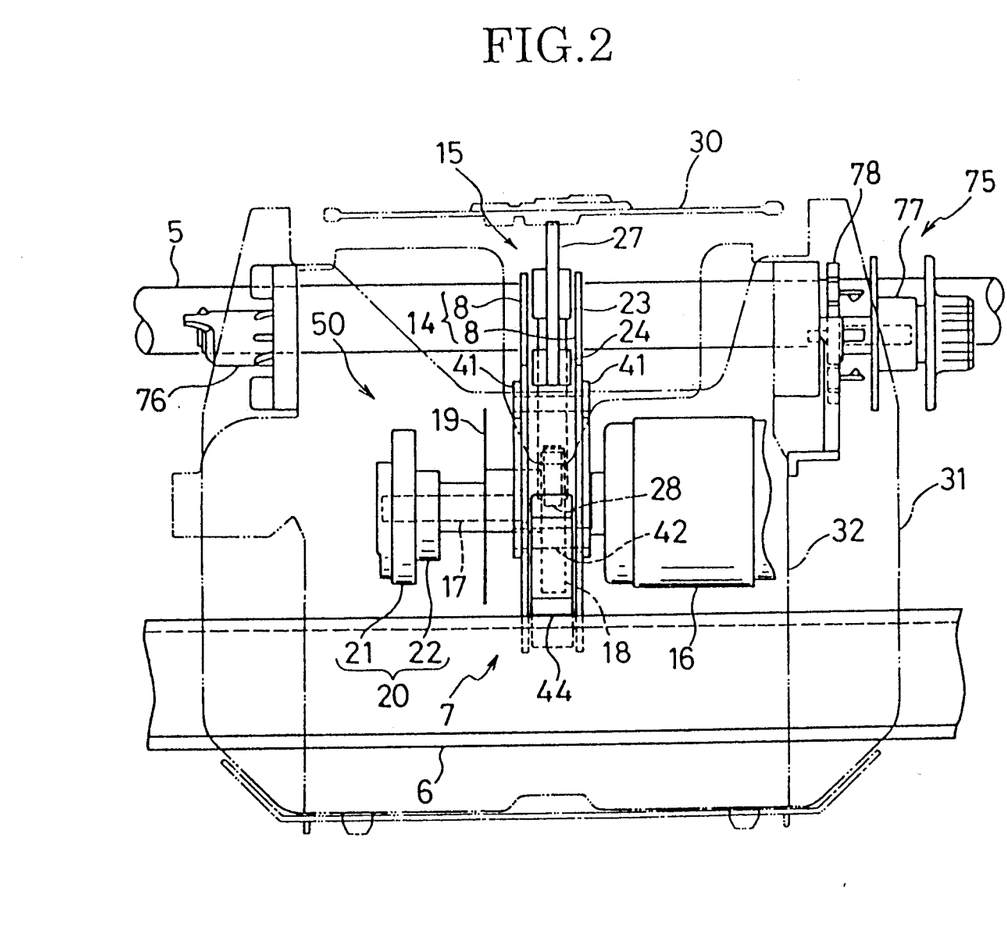
FIG. 2 is a perspective view of the electronic typewriter.
Figure 3:
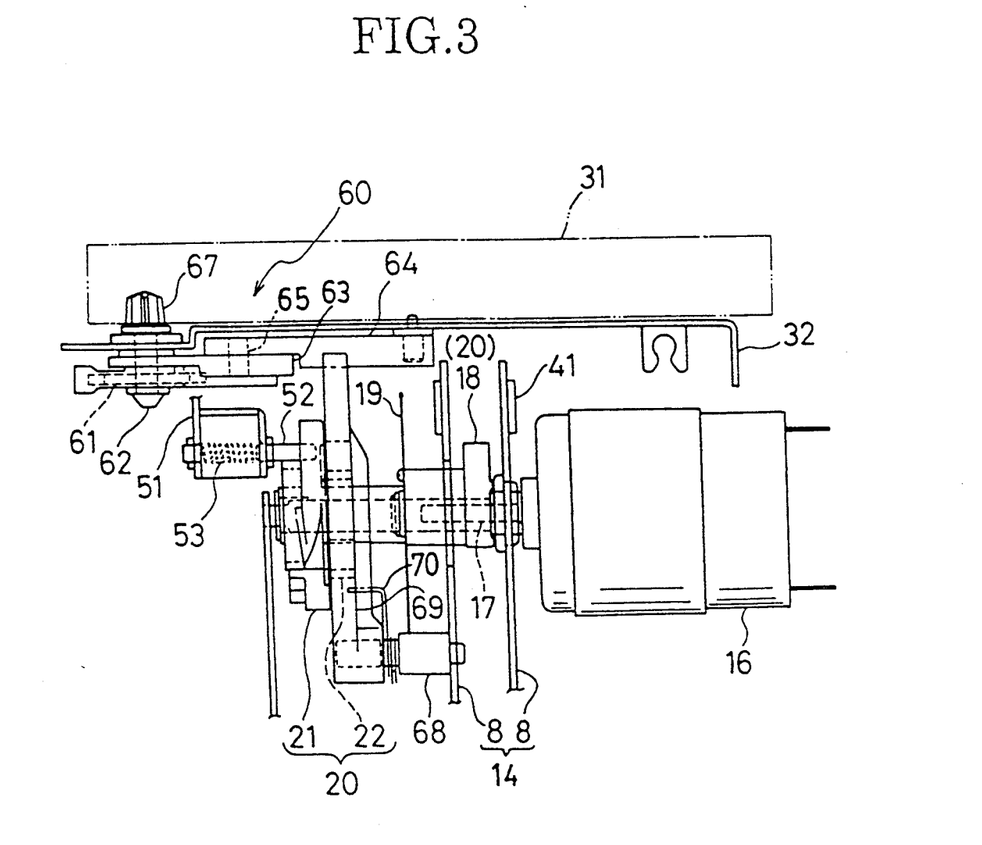
FIG. 3 is a partial front view of the internal mechanism of the electronic typewriter.

As shown in FIGS. 1 and 2, a pair of side walls 2 are disposed at right and left ends inside of a casing of a typewriter 1. A platen 3 interposed between the side walls 2 is rotatably supported on the side walls 2 in the vicinity of both ends of a platen shaft 4, and rotatably driven via a driven gear fixed to the left end of the platen shaft 4 by a platen drive mechanism having a line feed motor 39 driven by a drive circuit 84 (see FIG. 6).

Between the pair of side walls 2, a guide shaft 5 and a guide member 6 having an almost U shape viewed sideways are arranged parallel to the platen 3. A carriage 7 movably supported in the lateral direction by the guide shaft 5 and the guide member 6 will be explained with reference to FIGS. 1 through 5.

Two plate-type main frames 8 spaced at a predetermined distance in the lateral direction and each having a substantial rectangular shape are arranged lengthwise between the guide shaft 5 and the guide member 6. The main frames 8 serve as the upper ends of first and second supporters 10, 11 of a support member 9 laterally movably and rotatably supported by the guide shaft 5. The main frames 8 are fixed outwardly by pins 12, 13 at the upper ends of the supporters 10, 11 as spacers inserted between the main frames 8. The two main frames 8 comprise a carriage unit 14.

Next, a print mechanism 15 will be described hereunder. A DC motor 16 is supported in the right main frame 8 in such a state as to prevent its own rotation.

The drive shaft 17 of the motor 16 extends leftward through the main frames 8. There are provided in the drive shaft 17, in order from the motor 16 side, a print cam 18 having a substantial whirl shape viewed sideways, the print cam 18 being located inside of the main frames 8, an encoder disk 19 for detecting a rotational speed of the motor 16, a ribbon supply cam 22 for feeding a print ribbon PR stepwise, and a lift cam 21 for lifting a holder member 32 to an erasure position. A cam unit 20 comprises the print cam 18, the ribbon supply cam 22 and the lift cam 21, wherein the ribbon supply cam 22 is formed integrally with the lift cam 21. The print starting position of the print cam 18 is shown in FIG. 1 and FIG. 2.

Figure 4:
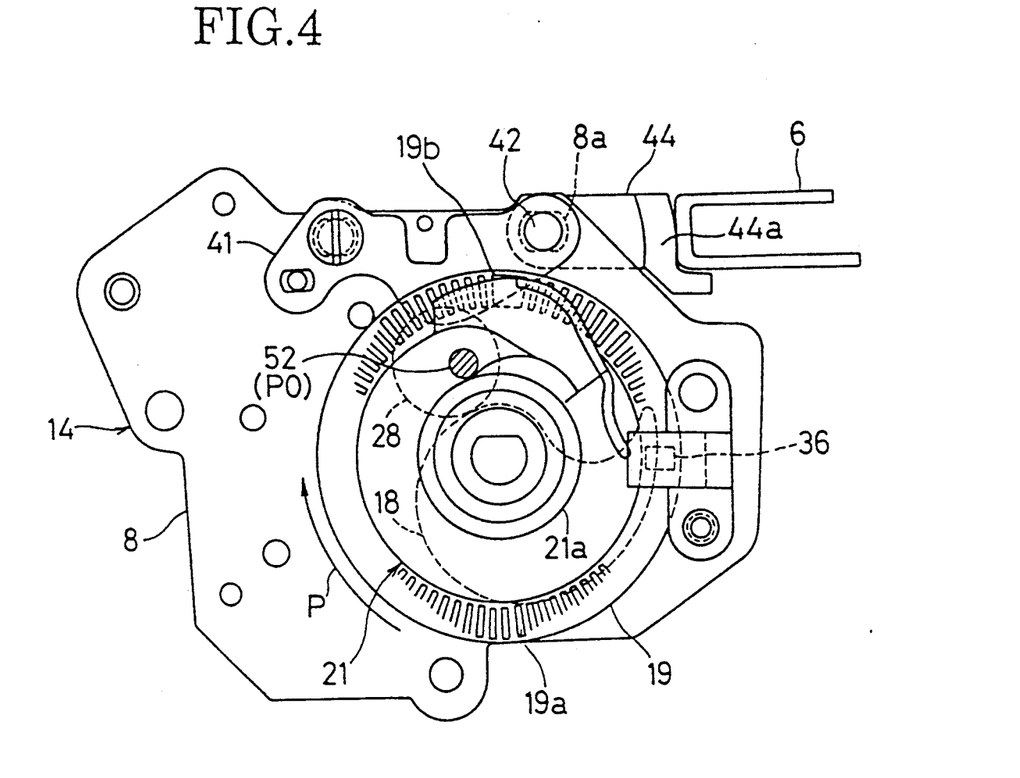
FIG. 4 is a side view of a carriage main body.
Figure 5:
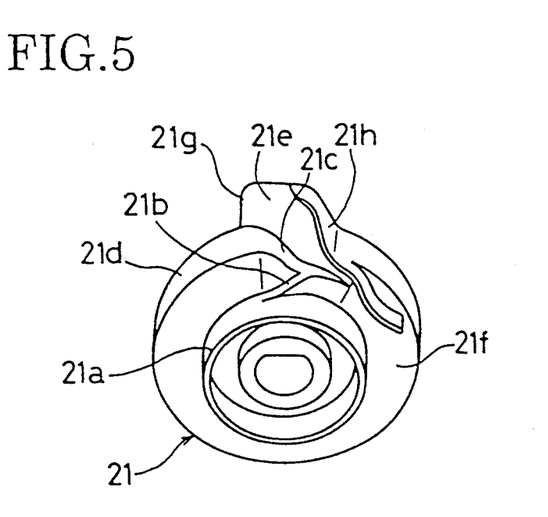
FIG. 5 is a perspective view of a lifting cam.

As illustrated in FIG. 4, a plurality of slits 19a are formed in order of circumferential direction, the slits being spaced by spacings having widths which are the same dimension as the width of each slit around the encoder disk 19. A photosensor 36 for detecting the plurality of slits 19a is attached to the left main frame 8. Namely, the photosensor 36 reads an encoder signal every time a start edge and an end edge of the slits 19a are moved according to the rotation of the encoder disk 19. The photosensor 36 inputs the encoder signal into the input/output interface 85 of a controller C. The plurality of slits 19a are disposed at 4.8 degrees with respect to an adjoining slit 19a. However, when the cam unit 20 rotates approximately 90 degrees from a phase of the print starting position toward the print direction P, a phase setting portion 19b of the encoder disk 19 is moved adjacent to the photosensor 36 in order to set the cam unit 20 in a predetermined phase. The phase setting portion 19b is formed between two slits 19a which are disposed at more than 4.8 degrees. The width of the phase setting portion 19b is about five times as large as that of the slit 19a. However, HIGH level time of the encoder signal at HIGH level period is equal to LOW level time at LOW level period.

Above the rear end of the main frame 8 are rotatably supported the central portion of a turn lever 23 having an almost V-shaped cross section and the lower end of a link 24 by pins 25, 26, respectively. A print hammer 27 disposed opposite to the platen 3 in the lengthwise direction is rotatably pivoted at a lower end thereof on the upper end of the link 24, and at the central portion thereof in the lengthwise direction on an upper end of the turn lever 23. Furthermore, at a fore end of the turn lever 23 is rotatably supported a cam follower 28, and a tension spring 29 is stretched across the upper end of the turn lever 23 and the lower end of the link 24 in such a manner that the cam follower 28 is held to abut against the surface of the print cam 18. There are shown a daisy wheel 30 rotatably driven by a wheel drive mechanism including a wheel drive motor 37 driven by a drive circuit 82 (see FIG. 6); a ribbon cassette 31 containing the print ribbon PR therein; and a holder member 32 having the ribbon cassette 31 mounted thereon, the holder member 32 being capable of vertically oscillating on an auxiliary frame 33 laterally movably supported on the guide shaft 5 via a support shaft 34. The carriage 7 is laterally reciprocated along the platen 3 through a drive wire by a drive mechanism including a carriage drive motor 38 driven by a drive circuit 83 (see FIG. 6).

As depicted in FIG. 4, the outer curved surface of the print cam 18 has a large radius enlarging ratio in the fore half within the slide range of the cam follower 28, and a minute ratio in the rear half including a strike portion where the cam follower 28 slides when the print hammer 27 strikes the platen 3. In addition, the curved cam of the print cam 18 extends by a predetermined length from the slide range in such a manner as to press the print hammer 27 against the platen 3 after the stroke of the print hammer 27.

Accordingly, since the cam follower 28 is lifted along the curving cam surface of the cam unit 20 by the print cam 18 upon the rotation of the motor 16 at a high speed by a given angle in the print direction P from the print starting position in FIG. 1, the turn lever 23 is turned counterclockwise and the print hammer 27 strikes the platen 3 via a type 30a of the daisy wheel 30 and the print ribbon PR.

Adjustment plates 41 extending lengthwise are disposed outside at the upper ends of the main frames 8, respectively. At the fore ends of the adjustment plates 41 is fixed a support shaft 42 inserted into slots 8a formed in the main frames 8. Moreover, an engagement portion 44a slidably engaging the rear end of the guide member 6 is disposed at the fore end of an abutment member 44 where the rear end of the support shaft 42 is rotatably supported.

Referring to FIGS. 1 through 5, an erasing mechanism 50 will be described hereinafter, which lifts the holder member 32 from the print position up to the erasure position where a correction ribbon CR phases to the print hammer 27 in place of the print ribbon PR in the character erasing operation.

The lift cam 21 is formed integrally with the ribbon supply cam 22 as the cam unit. The lift cam 21 formed on the left side of the cam unit comprises: a reference cam 21a having an equal radius from the center of the cam 21; a first inclined cam phase 21b extending in the radial enlarging direction continuously from the reference cam 21a; a second inclined cam phase 21c formed continuously on the way of the first inclined cam phase 21b and continuously to an outer cam phase 21d; a thin guide wall 21e extending in the radial enlarging direction from the right end of the second inclined cam phase 21c, the thickness of which is reduced from a left end phase 21f of the cam 21 shown in FIG. 2 toward a thin left end 21g of the guide wall 21e; and a guide rib 21h projecting from the guide wall 21e toward the left end 21f along the outer periphery of the guide wall 21e, and extending from the guide wall 21e toward the left end 21f in the radial reducing direction.

Furthermore, a driven pin 52 abutting against the lift cam 21 is laterally movably supported at the lower end of a support member 51 fixed at the upper end thereof to a side wall 32a at the left end of the holder member 32, to be resiliently urged rightward by a coil spring 53 at all times. The driven pin 52 allows the tip of the pin thereof to abut downward against the reference cam 21a by the dead load of the holder member 32 at the time of print start as illustrated in FIG. 4, to support the holder member 32 in the print position (reference oscillation position) and abut leftward against the left end 21f as depicted in FIG. 1. Namely, the vertical oscillation of the holder member 32 is determined by the vertical movement of the driven pin 52. FIG. 4 shows the positional relationship among the print cam 18, the lift cam 21, the driven pin 52 and the cam follower 28 at the time of print start.

Consequently, when the cam unit 20 is rotated by a predetermined angle from a phase angle in the direction reverse to the print direction P (hereinafter referred to as "the reverse print direction") by the motor 16 at the time of print start as shown in FIG. 4, the driven pin 52 is moved upward by the first inclined cam phase 21b so that the holder member 32 is also oscillated upward according to the distance of the upward movement, and then, the driven pin 52 reaches the outer cam phase 21d via the second inclined cam phase 21c upon the rotation of the cam unit 20 in the print direction P so that the holder member 32 is oscillated further upward in the erasure position. At this moment, the correction ribbon CR phases to the print hammer 27.

In addition, a print ribbon taking-up mechanism for taking up the print ribbon PR by a predetermined length in a taking-up spool until the print hammer 27 executes the print operation and a correction ribbon taking-up mechanism for taking up the correction ribbon CR by a given length in a taking-up spool after the erasing operation are provided. These mechanisms will not, however, be explained. Reference numeral 61 shows a ratchet connected to a taking-up spool 67 for taking-up the print ribbon PR, reference numeral 76 shows a supplying spool for winding up a correction ribbon CR, reference numeral 77 shows a taking-up spool for taking-up the correction ribbon CR and reference numeral 78 shows a ratchet connected to the taking-up spool 77.

Figure 6:
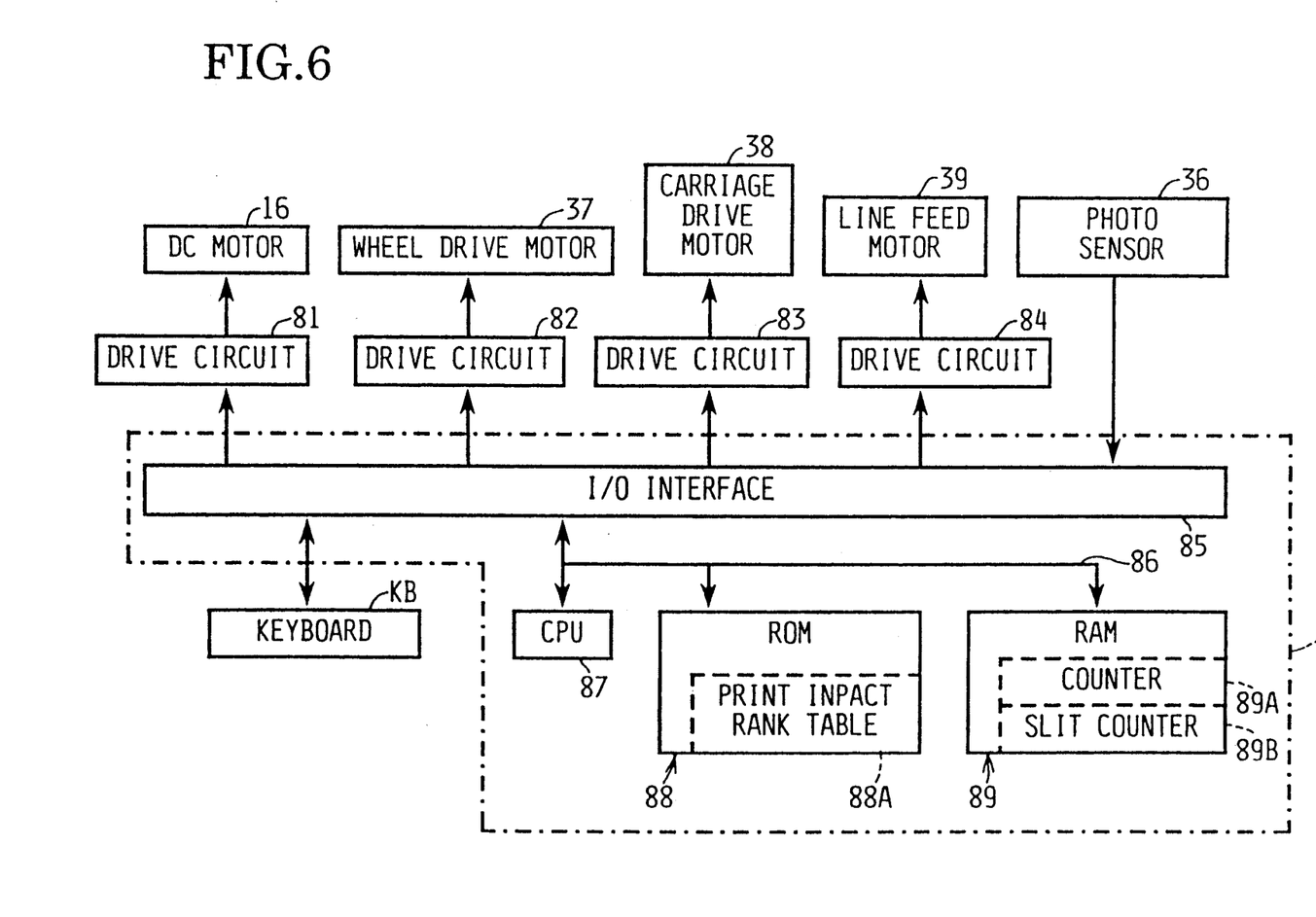
FIG. 6 is a block diagram of the control system of the electronic typewriter.

The control system of the electronic typewriter 1 is depicted in the block diagram in FIG. 6.

In the keyboard KB, character keys including alphabet keys, figure keys and symbol keys, a space key, a return key and various function keys are provided in a normal keyboard.

Hereinafter, a rotational speed control of the motor 16 will be explained. The controller C determines a duty ratio of PWM (Pulse Width Modulation) control to obtain a preset rotational speed by using the encoder signal output from the photosensor 36. A pulse signal of the duty ratio is supplied to a drive circuit 81 to input a drive current in response to the pulse signal to the motor 16.

The controller C comprises a CPU 87, the input/output (I/O) interface 85 connected to the CPU 87 via a bus 86 such as a data bus, a ROM 88 and a RAM 89. The ROM 88 stores therein a drive control program for driving the motor 16 to perform a print or erasing operation, another drive control program for driving the motors 37 through 39 in association with the print or erasing operation, a control program for a character print control executed when print keys including the character keys and the symbol keys are operated and a print impact rank table storing the information about the individual slit interval time t for each character which drives and controls the motor after the impact timing of the print hammer for a particular character. The RAM 89 contains therein a buffer for temporarily storing data required for controlling the typewriter 1 and a calculated result of the CPU 87, a counter 89A for timing the time in which the motor 16 rotates in the angle corresponding to each slit disposed in the encoder slit disk 19, a slit counter 89B for counting every transition of the encoder signal from LOW state to HIGH state and from HIGH state to LOW state, the slit signals output in sequence from the original set position, a plug, a pointer and various memories.

In addition, character codes for the characters and the symbols are classified into about seven print impact rank tables in order to be set in a particular print impact in the print operation. Therefore, the HIGH level time in which the encoder signal is HIGH level and the LOW level time in which the encoder signal is LOW level, that is, a print impact rank table which associates, respectively, a slit time t which each character individually has with each character code, is stored in the ROM 88 in order to set the rotational speed of the cam unit 20 according to the print impact.

Next, a routine of the character print control to be executed by the control device C of the typewriter 1 will be explained with reference to FIGS. 9 through 12. Number Si (i=10, 11, 12 . . . ) shows each step in Figures.

Figure 7:
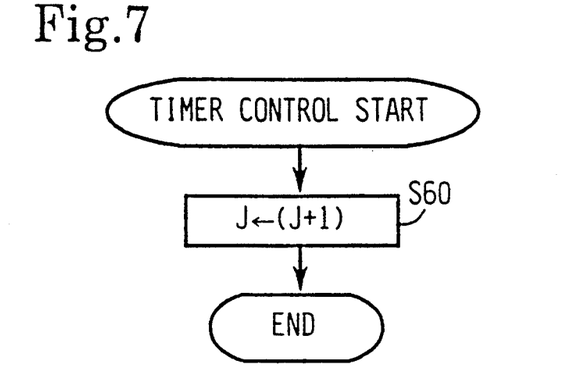
FIG. 7 is an outline flowchart for showing a routine of a timer control to be executed in an interruption processing.
Figure 8:
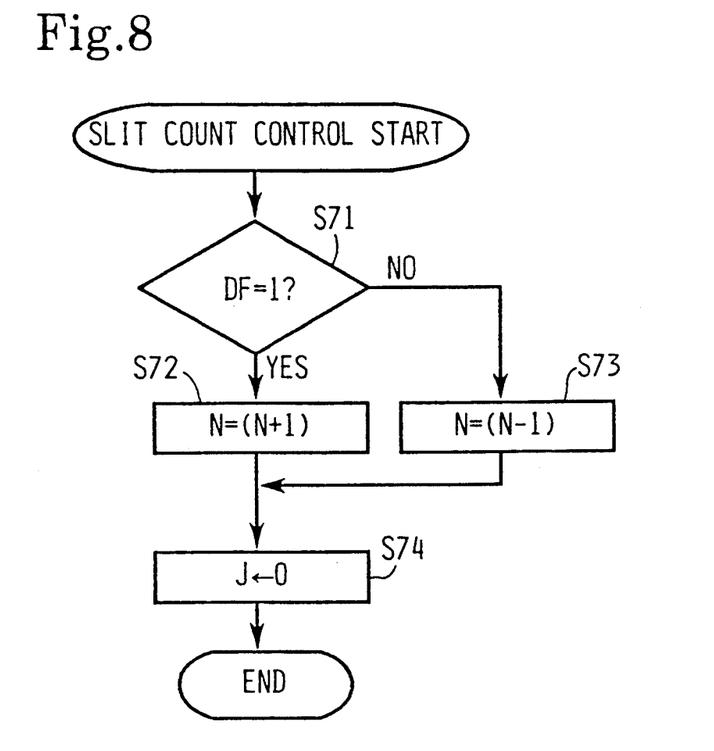
FIG. 8 is an outline flowchart for showing a routine of a slit count control to be executed in the interruption processing.
Figure 9:
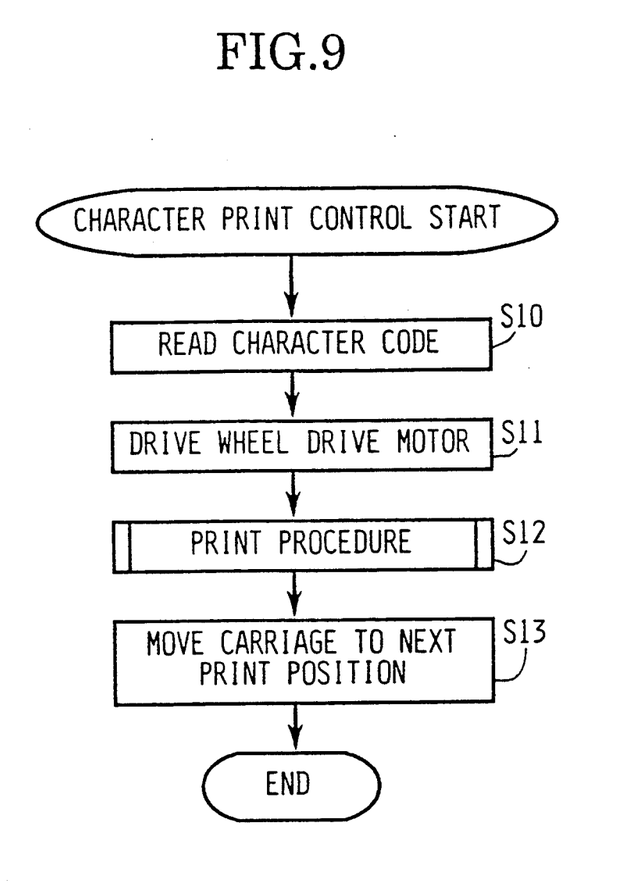
FIG. 9 is an outline flowchart for showing a routine of a character print control.
Figure 10:
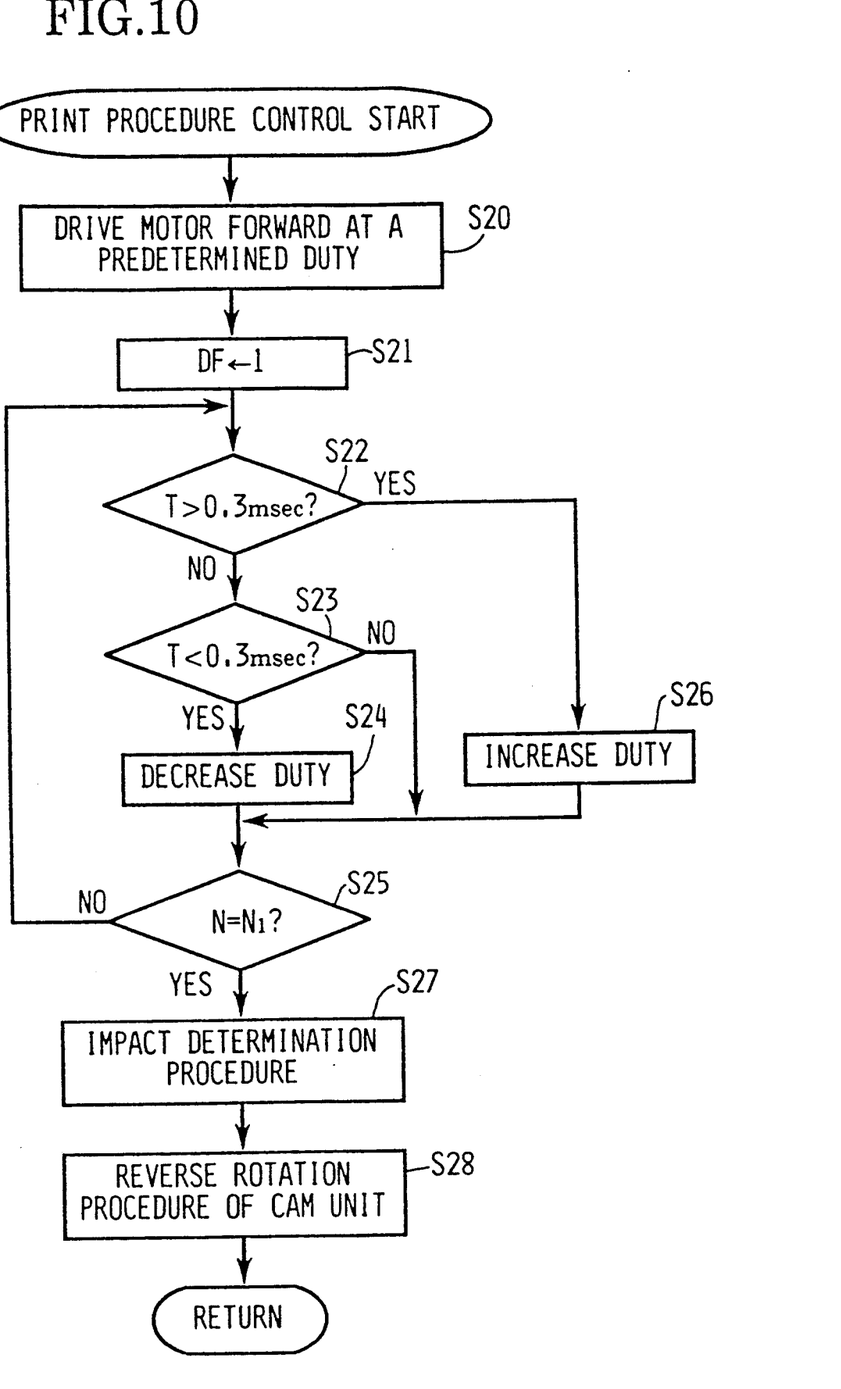
FIG. 10 is an outline flowchart for showing a routine of a print procedure control.
Figure 11:
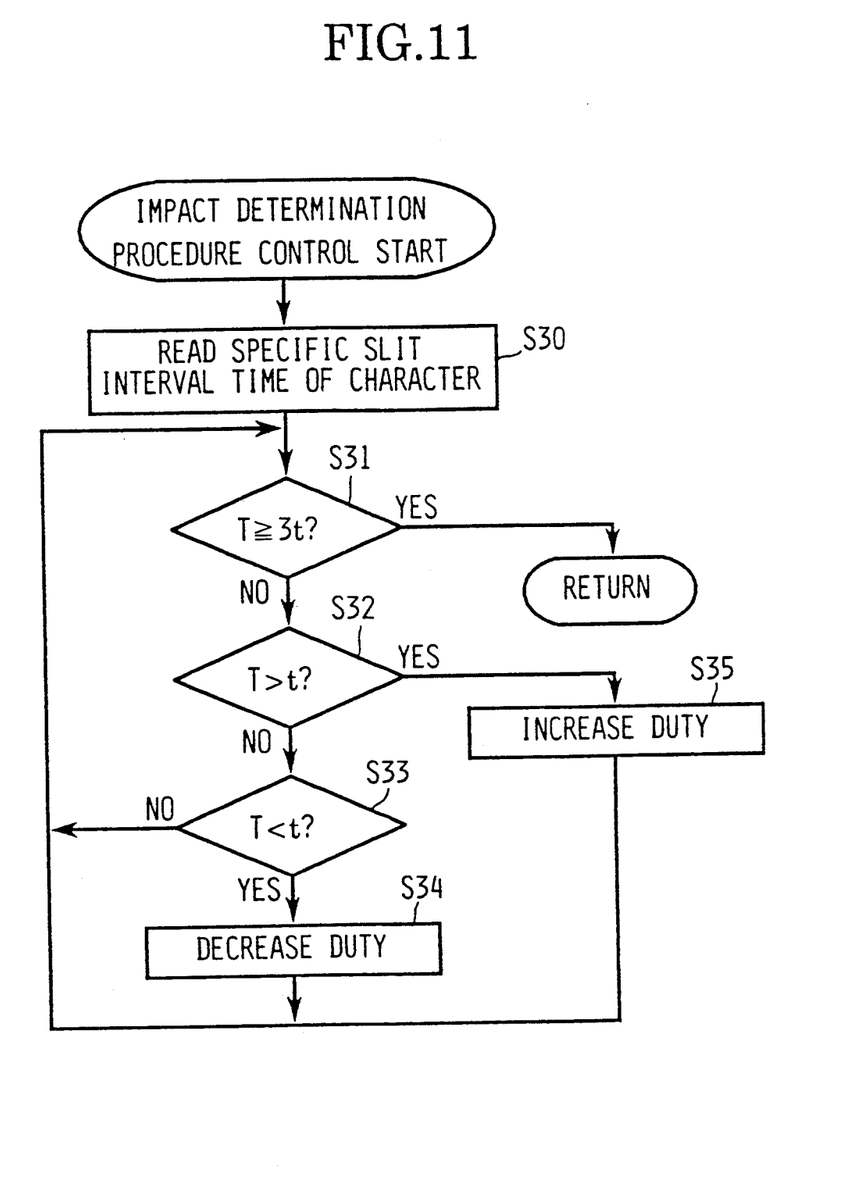
FIG. 11 is an outline flowchart for showing a routine of an impact determination procedure control.
Figure 12:
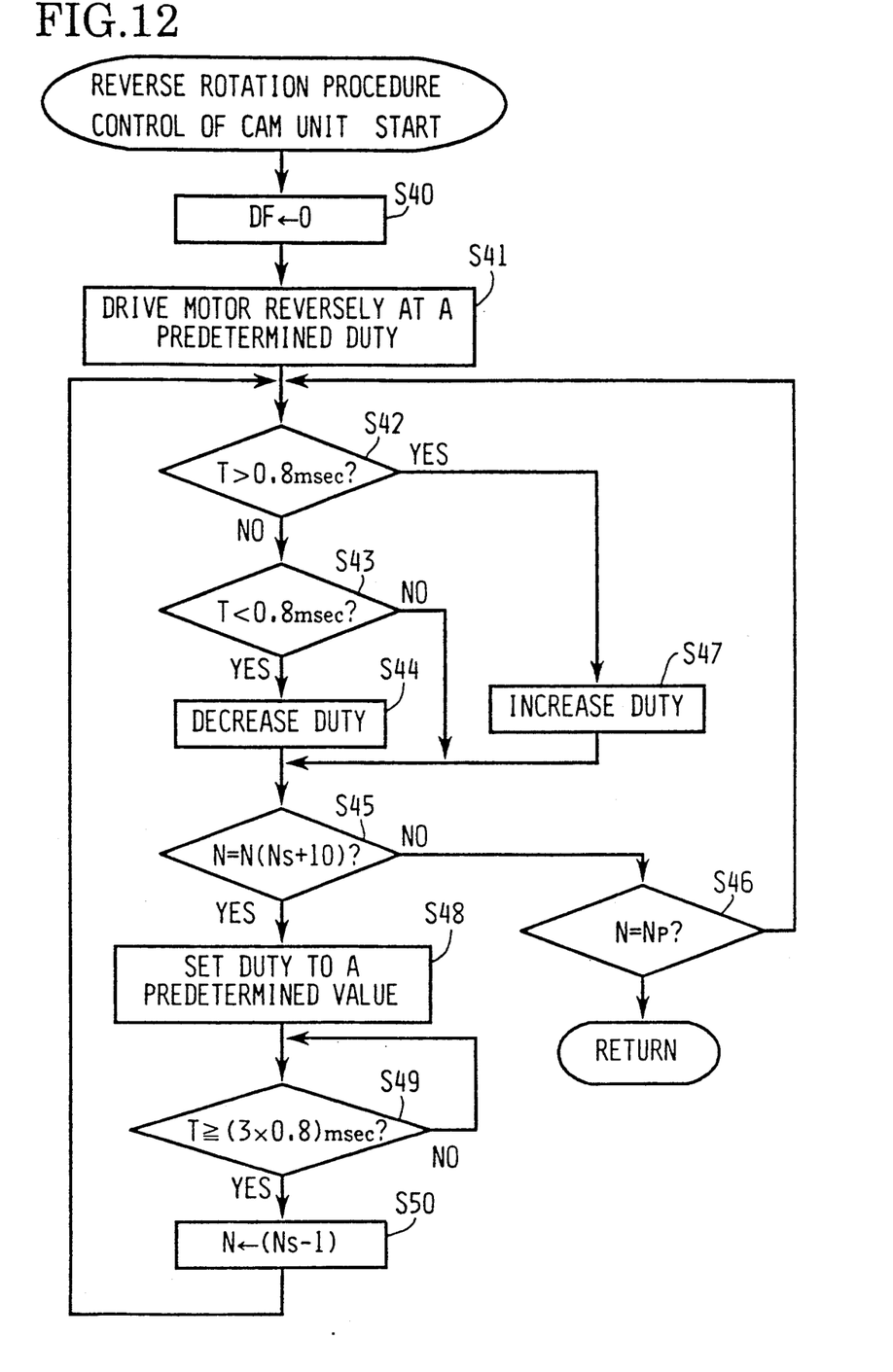
FIG. 12 is an outline flowchart for showing a routine of a reverse rotation procedure control of a cam unit.

Hereinafter, in the character print control operation, a subroutine of a timer control and a subroutine of a slit count control which are executed by an interruption processing for the CPU 87 will be explained with reference to FIG. 7 and FIG. 8.

In the character print control operation, the timer control is started by an interval interruption. In Step 60, the CPU 87 adds only one to the count value J of the counter 89A every 100 μsec. and the control is ended. Further, after the character print control is started, the slit count control is started every transition of encoder signal output from the photosensor 36 (see FIG. 8). When a rotational direction flag DF is set (data is 1) and the rotational direction of the motor 16 is in the print direction P (S71:Yes), the CPU 87 adds one to the count value N of the slit counter 89B (S72). The count value J is reset (S74) and after Step 74, the interruption control is ended. However, when the rotational direction flag DF is reset and the rotational direction of the motor 16 is not the print direction P (S71:No), the CPU 87 subtracts one from the count value N (S73) and the interruption control is ended. When the count value N of the slit counter 89B is added or subtracted, the time in which the motor 16 rotates in the angle corresponding to one slit is determined based on the count value J of the counter 89. Based on the time, the CPU 87 executes the feedback control for the rotational speed of the motor 16.

When the character keys and the symbol keys are operated on the keyboard KB, the character print control is started. The character codes are read according to the signal from the keyboard KB (S10). A wheel drive motor 37 is driven such that the type 30a corresponding to the character code confronts the print hammer 37 (S11) and the print procedure control (see FIG. 10) is executed (S12).

When the print procedure control is started, the motor 16 is driven so as to keep rotating forward at the predetermined duty ratio for rotating the motor 16 (S20). The cam unit 20 is rotated from the phase of the print starting position to the print direction P shown in FIG. 1 and FIG. 4. The print hammer 27 is moved to the direction of the platen 3 by the cam which rotates in synchronization with the rotation of the cam unit 20 while the taking-up operation for taking-up the print ribbon PR is executed. Next, when the slit interval time T based on the count value J is longer than 0.3 μsec., that is, when the rotational speed of the cam unit 20 is slow (S22:Yes), the duty ratio is increased by the predetermined value (S26). Further, when the count value N of the slit counter 89B is not the count value NI corresponding to the impact timing for impacting the platen 3 by the hammer 27 (S25:No), the CPU 87 returns to Step 22. When the slit interval time T is shorter than 0.3 μsec., that is, the rotational speed of the cam unit 20 is high (S22:No, S23:Yes), the duty ratio is decreased by the predetermined value (S25) and the CPU 87 returns to Step 22.

Therefore, until the count value N reaches the count value NI of the knock timing, the slit interval time is held at 0.3 μsec. Thus, the cam unit 20 is usually rotated at the predetermined speed. In addition, the phase setting portion 19b passes through the photosensor 36 until the count value N reaches the count value NI. The cam unit 20 can, however, rotate at the predetermined speed without being affected by the phase setting portion 19b because the rotational speed of the encoder disk 19 is very fast.

Next, when the count value N reaches the count value NI in the impact timing (S25:Yes), the impact determination procedure control (see FIG. 11) is executed (S27). When the impact determination procedure control is started, the slit interval time t (μsec.) of each character is read from the print impact rank table 88A based on the character code (S30). In a similar manner as described above, when the slit interval time T is shorter than three times as much as the slit interval time t and is longer than the slit interval time t (S31:No, S33:Yes), the duty ratio is increased by the predetermined value (S35). When the slit interval time T is shorter than the slit interval time t (S31 and S32:No, S33:Yes), the duty ratio is decreased by the predetermined value (S34).

When the print hammer 27 impacts the platen 3, the rotational speed of the cam unit 20, that is, that of the motor 16 slows down rapidly through the actuating connection between the cam follower 28 and the printing cam 18. When the slit interval time T is longer than three times as much as the slit interval time t, the print operation is completed (S31:Yes). The impact determination procedure control is ended and the CPU 87 returns. However, it is possible that the rotational phase of the cam unit 20 does not correspond to the count value N because the cam unit 20 is vibrated through the print mechanism 15 by the impact of the print hammer 27. Further, a reverse rotation procedure control of the cam unit 20 (see FIG. 12) is executed in order to return the print hammer 27 to the print starting position (S28).

When the reverse rotation procedure control is executed, the rotational direction flag DF is reset (S40) and the motor 16 is driven so as to keep rotating reversely at the predetermined duty ratio for rotating the motor 16 (S41). Next, in a similar manner as described above, the motor 16 is controlled at the speed which is determined by setting the slit interval time to 0.8 μsec. in Step 42-Step 47 until the count value N of the slit counter 89B reaches more than a count value NS plus 10. The count value NS corresponds to the starting position of the phase setting portion 19b. However, the count value NP corresponds to the print starting position of the cam unit 20 and the count value NS is at least count value NP.

When the count value N reaches the count value NS plus 10 (S45:Yes), a feedback control for the motor 16 is stopped because the phase setting portion 19b passes through the photosensor 36. The motor 16 is controlled at the predetermined duty ratio (e.g., if a turning on ratio of current is 50%, turning on duration of current is 50 μsec.) (S48). Next, when the slit interval time T reaches more than 2.4 μsec. in passing operation of the phase setting portion 19b through the photosensor 36 (S49:Yes), the value (NS-1) corresponding to the terminal position of the phase setting portion 19b is set in the count value N (S50). Therefore, the predetermined value (NS-1) is set in the count value N, so that, the predetermined phase of the cam unit 20 is set.

Afterwards, the motor 16 is set at the speed which is determined by setting the slit interval time 0.8 μsec. (S42-S46). When the count value N reaches the count value NP (S46:Yes), the reverse rotation procedure control is ended and the CPU 87 returns (S13). The carriage main body 14 is moved to a next print position by a carriage drive motor (S13) and the character print control is ended.

As described above, the phase setting portion 19b is formed in the encoder disk 19. When the count value N of the slit counter 89A reaches the count value NS corresponding to the starting position of the phase setting portion 19b plus 10, the feedback control is stopped such that the motor 16 is controlled at the predetermined duty ratio until the phase setting portion 19b passes through the photo interrupter 36. Therefore, the rotational speed of the motor 16 is prevented from increasing too rapidly by the feedback control while the phase setting portion passes through the photo interrupter 36. Thus, the CPU 87 can accurately detect the phase setting portion 19b of the encoder disk 19 based on the encoder signal.

In addition, it may be that the motor 16 is driven at the duty ratio which is determined just before the feedback control is stopped in Step 47 for the reverse rotation procedure control of the cam unit 20.

It may also be that the count value N is set at the predetermined value so as to be corrected when the phase setting portion 19b passes through the photosensor 36 in rotation of the cam unit 20 toward the print direction P.

In addition, it is possible to form two or more phase setting portions in the encoder disk 19.

The present invention can be applied to devices with a direct current servo motor or an alternating current servo motor. These servo motors are used for rotating the rotational member of the drive shaft of various devices, for example, tool machines and robots.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A servo motor having a servo motor control device for controlling the servo motor based on an encoding signal, comprising:
    an electric motor having a driving shaft;
    an encoder disk plate fixed to a rotational member, said rotational member rotating with the driving shaft of the motor, said disk plate rotating with said rotational member, said disk plate having a plurality of slits provided therein, said slits being spaced by at least a predetermined interval in a circumferential direction of said disk plate;
    a phase setting portion disposed in said disk plate, said phase setting portion comprising an interval larger than said predetermined interval between a pair of said slits, remaining ones of said slits being spaced by said predetermined interval;
    detecting means for detecting a plurality of said slits in said disk plate and for providing an encoding signal;
    control means for controlling a rotational speed of said motor based on said encoding signal from said detecting means;
    count means for counting the slits based on said encoding signal from said detecting means and for providing a count value; and
    instruction means for instructing said control means to cease controlling the rotational speed of the motor while at least said detecting means detects said phase setting portion in said disk plate based on said count value of said count means.

2. The servo motor according to claim 1, wherein said instruction means instructs said control means to begin ceasing of control of the rotational speed of the motor prior to detection by said detection means of said phase setting portion in said disk plate.

3. The servo motor according to claim 1, wherein said slits have widths which are substantially equal to said predetermined interval.

4. The servo motor according to claim 3, wherein said phase setting portion has a width substantially five times larger than the slit width.

5. The servo motor according to claim 1, wherein said detecting means is a photosensor, said photosensor providing said encoding signal when each of a start edge and an end edge of said slits is detected upon rotation of said disk plate.

6. The servo motor according to claim 1, wherein said phase setting portion is provided between two slits which are oriented more than substantially 4.8 degrees with respect to one another, a remainder of said slits being oriented substantially 4.8 degrees with respect to one another.

7. The servo motor according to claim 1, wherein said count means increments the count value as said disk plate rotates in one direction and decrements the count value as said disk plate rotates in a direction opposite to said one direction.

8. The servo motor according to claim 1, wherein particular count values provided by said count means correspond to positions of a print cam unit, said print cam unit being driven by said motor.

9. The servo motor according to claim 8, wherein said cam unit includes a cam follower for driving a print mechanism of a printer, the print mechanism having a print hammer and a print ribbon.

10. The servo motor according to claim 1, wherein said servo motor is a direct current servo motor.

11. The servo motor according to claim 1, wherein said servo motor is an alternating current servo motor.

12. A servo motor control device for controlling a servo motor based on an encoding signal, comprising:
    an encoder disk plate adapted to be rotated by the motor, said disk plate having a plurality of slits provided therein, said slits being spaced by at least a predetermined interval in a circumferential direction of said disk plate;
    at least one phase setting portion disposed in said disk plate, said at least one phase setting portion comprising an interval larger than said predetermined interval between a pair of said slits, remaining ones of said slits being spaced by said predetermined interval;
    detecting means for detecting a plurality of said slits in said disk plate and for providing an encoding signal;

control means for controlling a rotational speed of the motor based on the encoding signal from said detecting means;

count means for counting the slits based on said encoding signal from said detecting means and for providing a count value; and instruction means for instructing said control means to cease controlling the rotational speed of the motor while at least said detecting means detects said phase setting portion in said disk plate based on said count value of said count means.

13. The servo motor according to claim 11, wherein said instruction means instructs said control means to begin ceasing of control of the rotational speed of the motor prior to detection by said detection means of said phase setting portion in said disk plate.

14. The servo motor according to claim 11, wherein said slits have widths which are substantially equal to said predetermined interval.

15. The servo motor according to claim 3, wherein said phase setting portion has a width substantially five times larger than the slit width.

16. The servo motor according to claim 13, wherein said detecting means is a photosensor, said photosensor providing said encoding signal when each of a start edge and an end edge of said slits is detected upon rotation of said disk plate.

17. The servo motor according to claim 11, wherein said phase setting portion is provided between two slits which are oriented more than substantially 4.8 degrees with respect to one another, a remainder of said slits being oriented substantially 4.8 degrees with respect to one another.

18. The servo motor according to claim 11, wherein said count means increments the count value as said disk plate rotates in one direction and decrements the count value as said disk plate rotates in a direction opposite to said one direction.

19. The servo motor according to claim 11, wherein particular count values provided by said count means correspond to positions of a print cam unit, said print cam unit being driven by said motor.

20. The servo motor according to claim 11, wherein said cam unit includes a cam follower for driving a print mechanism of a printer, the print mechanism having a print hammer and a print ribbon.

* * * * *